United States Patent
Rhoads

(10) Patent No.: US 6,726,339 B2
(45) Date of Patent: Apr. 27, 2004

(54) RING TELESCOPE SYSTEM

(76) Inventor: Geoffrey B. Rhoads, 2961 SW. Turner Rd., West Linn, OR (US) 97068

( * ) Notice: Subject to any disclaimer, the term of this patent is extended or adjusted under 35 U.S.C. 154(b) by 0 days.

(21) Appl. No.: 10/178,047

(22) Filed: Jun. 21, 2002

(65) Prior Publication Data

US 2003/0128444 A1 Jul. 10, 2003

Related U.S. Application Data

(60) Provisional application No. 60/347,384, filed on Jan. 9, 2002.

(51) Int. Cl.$^7$ ................................................ G02B 5/08
(52) U.S. Cl. .................. 359/857; 359/858; 359/399
(58) Field of Search ................ 359/857, 858, 359/859, 351, 399, 419, 429, 850, 846, 849; 356/121; 250/201.9; 248/346.3, 476

(56) References Cited

U.S. PATENT DOCUMENTS

| | | | | |
|---|---|---|---|---|
| 4,424,802 A | * | 1/1984 | Winders | 126/575 |
| 4,981,354 A | * | 1/1991 | DeHainaut et al. | 356/139.1 |
| 5,108,168 A | * | 4/1992 | Norbert. Massie A. et al. | 359/419 |
| 5,120,128 A | * | 6/1992 | Ulich et al. | 356/121 |
| 5,229,889 A | * | 7/1993 | Kittell | 359/849 |
| 5,730,117 A | * | 3/1998 | Berger | 126/604 |
| 5,905,591 A | * | 5/1999 | Duncan et al. | 359/399 |
| 6,084,227 A | | 7/2000 | Rhoads | 250/201.9 |

* cited by examiner

Primary Examiner—Mohammad Sikder
(74) Attorney, Agent, or Firm—Stoel Rives LLP

(57) ABSTRACT

λUVt sampling is employed to achieve high resolution imagery without sub-wavelength system tolerances. An exemplary application is a 20 meter outside diameter orbiting, earth-watching ring telescope utilizing 40 identical commercial, off-the-shelf (COTS)-grade convex primary mirrors of 80 cm diameter each. Its nominal orbit is geosynchronous, with a designed ground resolution of approximately 1 m at 500 nm. It is configured such that there is no macro-structure pointing, where the primary mirrors are solely responsible for gross target pointing and no phasing whatsoever. The overall wavefront error budget is on the order of λ or even worse, rather than the more traditional λ/10.

5 Claims, 1 Drawing Sheet

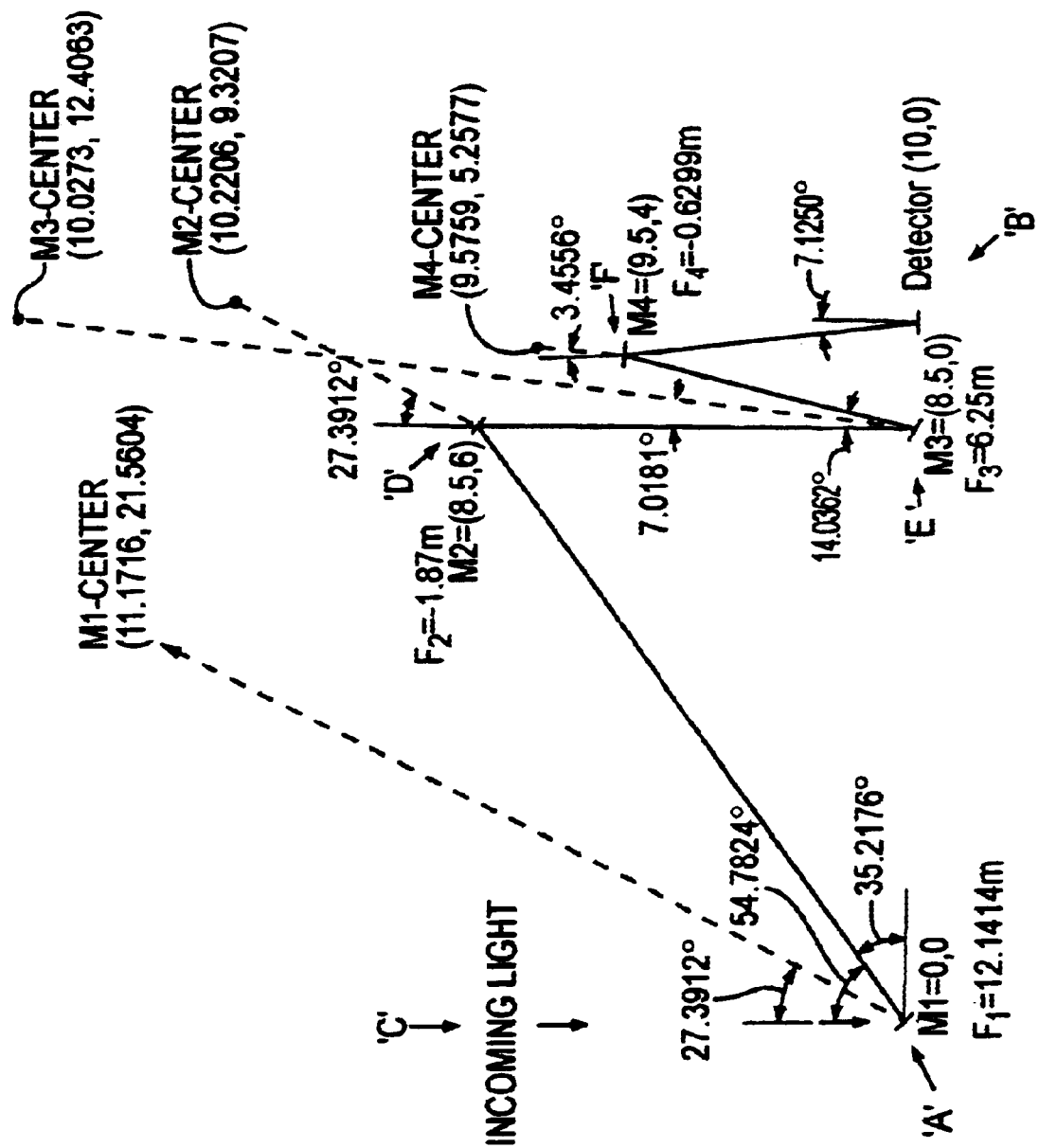

RING TELESCOPE SYSTEM

RELATED APPLICATION DATA

This application claims benefit of U.S. Provisional Patent Application No. 60/347,384, filed Jan. 9, 2002, the disclosure of which is incorporated herein by reference.

FIELD OF THE INVENTION

The present invention relates to telescopes, and more particularly relates to telescopes employing an array of sensors, e.g., in a ring configuration.

BACKGROUND OF THE INVENTION

Applicant's prior inventive work in the field sought to reduce the cost of achieving diffraction limited imaging performance through turbulent atmospheres on very large ground based telescopes. Some of those approaches were loosely based on work published by Primot in 1989, known as "deconvolution from wavefront sensing"—an advance on speckle imaging methods. Applicant's work, in part, extended those methods to include very wide fields of view, set within the context of strong anisoplanatism (the point spread function changing rapidly as a function of field angle). The designs and computer simulations were validated at that time, further independent work in the field has generally validated the overall approach, and applicant's work led to, among other things, U.S. Pat. Nos. 5,412,200, 5,448,053, 6,028,300 and 6,084,227.

The present work expands on the foundation set by the earlier work.

DETAILED DESCRIPTION

The classical definition of diffraction limited optics goes something like this: "classical aberrations are negligible and the image of a point source is dominated by diffraction effects." These are words directly out of the NGST monograph series, and the basic principle is well known to all first year optics grad students. Metrics such as the Strehl ratio and encircled energy are equally classic attempts to bottle this general concept into numerical methods of comparison and standardized communication. Though experts are quick to point out that these simple metrics should not be used to compare and contrast the details of competing designs, the fact remains that the general notion behind diffraction limited optics is taken axiomatically as the very definition to which a final system design should aspire.

There is no question that, by this definition, diffraction limited optical designs are optimum optical performers. Optical energy is concentrated for photometric purposes as well as for spectrographic slit input purposes, and a very broad range of wavelengths are de facto in phase once the whole structure is in phase. Aberrations naturally develop as one moves off the paraxial center of the image, but these become pro-actively manageable and tracked as MTF fall-off or equivalents.

Be this as it may, there are two related and now well-known issues when applying the classic notion of diffraction limited optics to non-astronomical telescopes (e.g., telescopes used in imaging photon-rich subjects—unlike the faint subjects commonly the subject of astronomical investigations):

1) Though optimum, the classic definition of "diffraction limited optics" is not necessary to achieve "diffraction limited imaging".
2) The cost of achieving diffraction-limited optics is steeply exponential as a function of aperture size (and hence, desired resolving power).

There are many ways to define what is necessary for diffraction limited imaging. The most thorough and accurate is also the most abstract: defined in linear algebraic terms, whereby the finite outside diameter of a telescope gives rise to a finite number of unknown object bases functions, diffraction limited imaging is thus the independent and "reasonable signal to noise ratio" sampling of these independent functions.

A more well known but somewhat misleading definition is to choose the Fourier space as one's bases functions, and to speak of good independent measurement of the entire UV plane as the proper definition of diffraction limited imaging. The early Golay work and much of the sparse aperture surface topology work is well served by this definition, but it does suffer from anisoplanatism subtleties as well as local/global subtleties that bases functions such as wavelets are meant to address.

In any event, the present disclosure ultimately uses the lay definition of diffraction limited imaging: is the picture we get from this one as good as the picture we get from that one? Certainly a variety of clean metrics such as NIRS ratings, Strehl ratios, target-contrast charts and the like can be used to quantify the performance.

With all due respect to the myriad trade-offs between system performance metrics beyond "ground resolution," it is the latter issue—cost—which needs to drive a system design to the rudimentary (and necessary) floor for diffraction limited imaging. It should do so in such a way that all other system requirements remain un-compromised (or at least acceptably compromised as a trade-off against massive cost reductions and re-use of funds).

Non-filled circular apertures are also not new, typified by the early Golay configurations and explicitly relying on full UV plane sampling with diffraction limited optics. These precedents are heavily relied upon in the illustrative embodiments, with a few extra twists. For example, some embodiments of the invention offer designed-in tolerance for $\lambda$-scale wavefront error budgets, instead of $\lambda/10$-scale error budgets as in earlier work. Such a large error budget permits simplification and de-tolerancing of a primary mirror structure, such as in the depicted "ring" configuration. Some embodiments of the invention also utilize primary detector phasing feedback loops for in-situ imaging even on lower contrast natural scenes, where it turns out that the ring structure has certain properties that can simplify the algorithms for these realtime phasing loops. These loops can also be integral to providing the "phase reference" with which the instantaneous optical figure of the telescope is measured and fed back into the primary detector data processing.

Through particulars such as these, a central thesis here followed is that the entire design process can boil down to a fundamental relationship between cost and exposure-time-per-image, at a fixed (and essentially arbitrary) image quality. This relationship is offered as a direct replacement to the classic diffraction limited optics axiom. In space-based telescopes, the difference to a final design configuration can be profound once it ripples out into optical wavefront tolerancing, weight, launch robustness, self-assembly, standard parts (still space qualified), and reduced development, build and test schedule.

In the following disclosure, two somewhat separable and fairly detailed reference designs are offered up for analysis. The first is the more general data collection and processing approach coined here as $\lambda$UVt Sampling. This sampling method can potentially be applied to any existing telescope system design and/or architecture. Though there are minor physical hardware changes to an existing telescope design required for this method, it is largely a different approach to data collection and data processing. And, emphatically, it is explicitly not a form of "post-processing" but rather, it is fundamental to the primary detector system overall.

The second reference design is the result of trying to fully exploit the unique foundation provided by λUVt Sampling. In other words, given cost as the primary driver on a very large telescope design, and given the existence of λUVt Sampling, what might a telescope look like from scratch? The reference designs that will be used for discussion purposes will attempt to be very precise in its particulars, but unequivocally and expectedly open to variations and optimizations which may make a final system design look quite a bit different than the one used here to frame the concept.

One reference design is a 20 meter outside diameter orbiting, earth-watching ring telescope utilizing 40 identical commercial, off-the-shelf (COTS)-grade convex primary mirrors of 80 cm diameter each. Its nominal orbit is geosynchronous, with a designed ground resolution of approximately 1 m at 500 nm. It is configured such that there is no macro-structure pointing, where the primary mirrors are solely responsible for gross target pointing and no phasing whatsoever. A linear piston system on a compact central bus performs basic optical path lengh (OPL) equalization, while a secondary/tertiary mirror system equalizes the lateral magnification of each optical train. Both initial and ongoing phasing is achieved through primary detector feedback loops into either the secondary or the tertiary mirrors (tip-tilt-piston only). The primary detector itself is an assembly of four or five detectors each viewing a 20–50 nm bandpass image, tunable over the visible through near-IR. The overall wavefront error budget is on the order of λ or even worse, rather than the more traditional λ/10.

λUVt Sampling

The essence of λUVt processing is to "know" the optical phase of the system for any given exposure, as opposed to "maintaining" a diffraction limited optical state. The primary implication of this is that radical de-tolerancing of optical surfaces is possible, provided there remains a method to measure the residual wavefront error. The primary trade-off is that signal levels at higher frequencies are significantly reduced, hence driving the need for much longer exposure times to compensate for the lower signal levels.

The "λ" refers to needing wavelength bandpass filters generally provided by dichroic filters. This filtering ensures adequate signal levels at higher frequencies, which would otherwise be destroyed by spectral blurring. This is common practice in speckle imaging and wavefront-compensated deconvolution.

"UV" is the classic UV plane. In this case, however, it is a field-variant form of the UV plane rather than a global UV plane. This allows for adequately dealing with even fast-changing point spread functions as a function of field angle.

"t" is the notion that short exposures, on the order of a 10 Hz frame rate, adequately "freezes" the instantaneous distortion of telescope structure (again in defense against reducing the higher frequencies in the UV plane), while at the same time allowing for reasonable "movie" capabilities of the telescope.

(Though this may seem to contrast with the need for longer exposure times, this does not preclude the possibility of obtaining lower contrast and slightly higher distorted "movies" of scenes which can then be enhanced via a variety of well-known post-processing techniques (such as separating out higher quality "static elements" from objects in motion).)

The illustrations attached to the parent patent application illustrate some of the principles of λUVt sampling, and comparison to diffraction-limited optics. As can be readily seen, the λUVt sampling approach allows for significant phase distortion, provided it can somehow be post-facto measured.

The illustrations also show how, over time and through low bandwidth feedback mechanisms, the distortion profiles change. A system can be built such that this quasi-random cycling of the optical surfaces can ensure that, over e.g. a 10 to 20 second period, complete and adequate UV sampling is achieved. This is a somewhat different approach to the well known principle of covering the UV plane over some given period of time. But rather than having some macro-structure movement performing the time sampling, a naturally moving micro-topology is used instead.

A central theme is the analysis of cost versus exposure time trade-off: how costly is it to achieve lower and lower innate wavefront error budgets? Presumably some "steep cost elbow" will be encountered when moving from a 10λ innate error budget toward a λ/10 error budget. Choosing a final telescope structure design, which finds a low cost solution just before this cost elbow, is a central question of the design optimization process.

It will be noted that the UV amplitude sampling function changes as a function of time, corresponding to how a "pro-active" dither on the optical elements might look, second by second. This is the classic "boiling" pattern that is similar to the effects of Earth's atmosphere on large telescopes, only with much lower time bandwidths and much better behaved anisoplanatism. It should be expressly pointed out that this UV plane amplitude function also changes as a function of field angle, from the paraxial center to the image-detector corners. All of this is fully tolerated within the λUVt approach. This is a hidden and subtle advantage of the λUVt approach, wherein what classically is viewed as MTF fall-off as a function of field angle, the effect is much more subdued in that, for example, λ-scale distortions at the paraxial ray perhaps become 2λ-scale distortions at the field corners, with the same ability to adequately sample the local UV plane applying.

At the end of the day, very large space telescopes have vibrational and thermal properties that produce reasonably similar distorting effects as the Earth's atmosphere, only much better behaved in general. It only makes sense to borrow liberally from the established art in compensating such distortions. Deconvolution from wavefront sensing is relevant prior art in this regard.

λUVt sampling is an explicit extension of this prior art. The two primary extensions include a more explicit treatment of field variance, and, plausible methods to determine the wavefront figure error through primary data processing as opposed to needing a separate wavefront sensing unit. The particular arrangement of the ring telescope assists in this latter feature, though it should apply to any aperture geometry.

A key enabling factor in general speckle imaging systems has always been the availability of low noise fast frame-rate detectors. The recent work on avalanche stage amplification within CCD detectors (e.g., by Hynecek at Texas Instruments), as well as the swift progress of CMOS detectors in general, indicate that a ~10 Hz frame rate no longer carries the steep penalties it once did in terms of increased read noise. Encouraging the development of near-photon-counting detectors operating at 10 Hz is thus very important to achieving reasonable exposure times in what will be effectively very high f-number telescope systems. (See also, in relation to photon counting technology, U.S. Pat. No. 5,444,280.)

A high level architectural view of UVt sampling may include: Unknown Optical State t-naught over 100 ms; acquire and digitize primary data; Decompose into field variant UV bases functions; submit heavily filtered, field variant UV amplitude data into overdetermined matrix which solves for optical wavefront error (including polarity), store estimate; Derive phase/amplitude bias functions as function of UV and field point; update rms accumulators on UV-field points; apply system control signals to tip-tilt-piston system, after comparing latest estimate with t minus one state estimate (time/kalman filtering).

20 m Ring Telescope

As stated above, a reasonably detailed and specific reference design is presented which is an attempt to exploit λUVt sampling (and its exposure time vs. wavefront error properties) from scratch. Details of exemplary 20-meter ring telescopes follow.

High level architectural features of a sample telescope may include:

- 40 identical COTS-grade and lightweight 80 cm primary concave mirrors with rudimentary baffling for light, partial rad- and micro-meteorite protection
- Mirrors nominally tilted at 25 to 40 degrees from nadir
- Mirror placement may be subtly asymmetric about the ring for fuller UV coverage
- System designed to still be fully functional with eventual loss of several to many optical beams
- Coarse Tip-Tilt Pointing Only on Primaries (+/−10 degrees, ~sub-micron class resolution & repeatability) (piston motion may be desirable as redundancy feature, if low cost)
- Macro-Structure always Nadir-Pointing; Full Earth viewable
- Outer ring self-construction mechanisms independent from tension cable stabilization mechanisms
- Optional: slow rotation of ring
- Basic structural beams or tension cables between outer ring and compact central bus, with minimal control & power connections to outer ring beyond tip-tilt control/power, and any other optional redundancy measures (e.g. inter-system position sensing or star sensors)
- Central bus includes detector system and non-primary optics
- 40 identical secondary mirrors, from 15 cm–20 cm diameter, on long-travel coarse linear pistons with range of travel on the order of 3 to 4 meters depending on detailed design studies (this is the main OPL equalization mechanism)
- 40 identical tertiary mirrors, also on ~50 cm long travel linear pistons, this being the free parameter which equalizes lateral magnification
- Optional: detailed design studies on possibility of "zoom-out" capabilities by adding a linear-pistoned fourth mirror, possibly enabling a 10 meter resolution mode or coarser
- Basic low-weight baffling systems surrounding non-primary optical mirrors
- Fine-scale (<100 nm resolution/repeatability) tip-tilt-piston, with 1 to 10 micron range, placed optionally in conjunction with either secondary or tertiary mirror systems
- Optional for system redundancy: extended from central bus—single area-detector star sensor which partially overlaps 40 independent star scenes from the primary mirrors (provides quasi-independent and interdependent position measurement of the 40 primary mirrors relative to each other and to the central bus rigid structure)
- Optional: provisions to maximally physically mode-lock and de-momentum outer-ring vibrational modes with central bus modes as mediated through connecting structures/cables (redundant with linear piston OPL compensation)
- 4 or 5 8K by 8K primary detectors, visible and NIR broadband (silicon primarily? CCD? CMOS? Many options)
- Tilted dichroic mirror arrangements performing the beam splitting and spectral shaping many suitable options
- 20 nm–100 nm final bandpass depending on various factors, optimizations
- Near 1e–10 Hz frame rates desirable, down to 1 Hz acceptable, multi-read-out on each detector (e.g. 8 port independent read-outs)
- Raw data to localized UV plane decomposition stage; custom processing unit; no innate need to store raw data
- UV stage feeds parallel stages
- Optical surface feedback stage, and
- UV accumulator image synthesis stage Again, the foregoing combination of features are not all essential, but are provided to give the artisan a complete system view.

A more detailed embodiment is now described, with reference to the attached figure. The figure shows the optical path associated with one of the primary peripheral mirrors M1 ('A') that comprise the ring. Next to the mirror is given its nominal location in a Cartesian coordinate system that has the depicted primary mirror 'A' at the origin (0,0), and the detector 'B' 10 meters to the right, at location (10,0). Incoming light is received from direction 'C,' and is reflected by primary mirror 'A,' via intermediate mirrors 'D,' 'E,' and 'F,' to the detector 'B.'

The detector 'B' is mounted atop the telescope's central hub, which inside contains communications transceivers for control signals and data, thermal control systems, telescope control systems, etc. The detector in this embodiment comprises 5 8k×8k CCD arrays, using dichroic mirrors to split the incident light, i.e., one array for each of 5 different color bands. (The separate CCDs and dichroic mirrors are not particularly illustrated.)

Incident light from the primary mirror 'A' is first reflected to secondary mirror 'D,' at location (8.5, 6). From secondary mirror 'D' the light is reflected to tertiary mirror 'E,' at location (8.5, 0), and then to quartiary mirror 'F,' at location (9.5, 4), and then to the detector. It will be recognized that each primary mirror has a corresponding secondary, tertiary and quartiary mirror, so there are 40 of each in the depicted arrangement, forming generally concentric rings. (While generally concentric, the rings are not all co-planar. Indeed, as will be evident from the following, certain of the rings may be tilted, so they do not even lie in parallel planes. And, as noted, the rings may not be circular. The "generally" concentric qualifier is due to the fact that the component rings may be shifted small distances laterally, resulting in eccentric nesting of the different rings.)

As shown, the primary mirrors have a curvature providing a focal length of 12.1414 m. The secondary mirrors have a focal length of −1.87 m. The tertiary mirrors have a focal length of 6.25 m. The quartiary mirrors have a focal length of −0.6299 m.

Steering of the telescope can be effected by re-orienting the entire structure. More typically, however, steering is effected by re-orienting the primary mirrors 'A.' Each can be re-oriented, e.g., +/−10 degrees in all directions from its nominal position.

To achieve phased array imaging, three conditions must be met: (1) identical path lengths; (2) common optical path length; and (3) identical effective focal length. To simultaneously meet these three conditions, three independent variables are controlled, namely the positions of the secondary, tertiary and quartiary mirrors. The secondary and quartiary mirrors have positioning systems permitting lateral motions of up to about 10 cm. The tertiary mirror has a positioning system permitting lateral motions of up to about a meter.

Although not particularly depicted, it will be recognized that the mirrors are mounted on support structures that are linked to the central hub. (These support structures are desirably designed with narrow (e.g., tubular) members to avoid shadowing the component mirrors.)

In addition to the lateral movements of the secondary, tertiary and quartiary mirrors, the plane of the secondary mirror ring can be tilted by a mechanism that moves the corresponding support structure. Likewise, the plane of the tertiary mirror ring can be tilted by a separate mechanism that moves the tertiary mirrors' support structure.

In the illustrated arrangement, the central hub may have a radius of 1 meter, and the tertiary mirrors form a ring with a nominal radius of 1.5 meters. The tertiary mirrors may be mounted on a ring-shaped plate that can be moved laterally relative to the hub (e.g., permitting eccentric placement of the ring around the hub), and also tilted relative to the hub (tip/tilt). The lateral and tip/tilt movement of the secondary mirrors can be achieved by a similar arrangement Thus, a ring supporting structure can provide coordinated movement of all the mirrors of a ring in both lateral and tip/tilt directions. (In some arrangements, tip/tilt control of the secondary mirrors can be omitted.)

In the depicted embodiment, the tertiary mirrors are mounted on a linear, piston-driven actuator that permits +/−1 meter of vertical movement. In this arrangement, the single piston moves all 40 of the tertiary mirrors. Each mirror can also be provided with small scale positioning systems for precise vertical positioning from the baseline provided by the shared piston. Each mirror on the shared piston also has separate tip/tilt control.

Alternatively, instead of employing a single, shared vertical positioning system (with fine individual adjustments), each tertiary mirror can be mounted on its own linear actuator, permitting independent movement.

The quartiary mirrors are the "dog's tail," whose positions are dictated by the particular placement and orientation of the primary, secondary and tertiary mirrors to which each corresponds. As such, they typically require highly customized positioning. While a movable ring support structure as described for the secondary and tertiary mirrors may be employed for gross positioning, each mirror's position may be sufficiently independent that coordinated movement of the 40 mirrors by a movable support ring offers little benefit. In the depicted arrangement, the supporting structure for the quartiary mirrors is static, and each mirror is provided with its own lateral and tip/tilt positioners.

It will be recognized that the positions of the secondary mirrors depend on the position of the primary mirrors; and the positions of the tertiary mirrors depend on the positions of both the primary and secondary mirrors. Control arrangements may be devised that mechanically couple movement of the latter to the former to achieve at least gross positioning. Such control systems are simplified if the relationships of the components movements are linear. Non-linear relationships can be addressed by screw-driven cams and the like.

The primary mirrors are mounted on tip/tilt positioners to provide their steering capability. Here, as elsewhere, redundant positioning systems may be employed in anticipation of failures of certain systems in long term space environments. Thus, a tip-controlling motor may be mounted on a stage controlled by a tilt-controlling motor, which in turn is mounted atop a second tip-controlling motor, which in turn is mounted on a further tilt-controlling motor. The latter two motors generally are not used. However, if the first tip/tilt motors fail, the underlying tip/tilt motors can be used to preserve complete operation.

In addition, or alternatively, the motors that control the tip/tilt motions (e.g., through worm gears) can employ redundant motor windings, so if one motor winding fails, the control system can switch to the backup winding.

Loss of mirrors is akin to shuttering small parts of the telescope's aperture. Resolution will be somewhat impaired if many adjoining mirrors are lost, but overall telescope performance will not be seriously degraded until 25–33 of the mirrors are out of service.

When the beams from the 40 primary mirrors are superimposed on the detector array, a complicated diffraction pattern results—a complicated point spread function. This pattern is characterized and compensated—for using known techniques (e.g., those taught by the Rhoads patents cited above, and in Primot et al., "Deconvolution from Wave-Front Sensing: A New Technique for Compensating Turbulence-Degraded Images," J. Opt. Soc. Am. A, vol. 7, No. 9, September 1990, pp. 1598–1608) so as to yield the final image.

From geostationary orbit, it appears that the telescope described above can achieve an imaging resolution on the order of approximately 0.8 meters. If placed 10 times closer to earth, a resolution ten times greater could be achieved.

While the foregoing description has set forth one embodiment, the invention is not limited to arrangements like the one described. Principles from the detailed embodiment can be employed in a great variety of different systems.

It will be recognized that while the detailed embodiment employed certain degrees of movement (tip/tilt/lateral/vertical) for different mirrors, other embodiments of course can employ different combinations of movements (including for the detector). More generally, while the detailed arrangement employed four sets of mirrors (primary, secondary, tertiary, and quartiary), other embodiments can employ more or less sets. Likewise, the regular spacing of the mirrors about their respective peripheries is not essential; irregular spacing can be used in some embodiments.

The invention was described in the context of an orbiting, earth-imaging telescope. However, the same arrangement can be pointed the other direction and employed to image astronomical subjects. Likewise, such a telescope can be terrestrially-based, and used to image subjects in the atmosphere and beyond.

I claim:

1. A multi-aperture interferometric optical system formed of multiple sets of mirrors mounted on support structures operatively coupled to a platform, the optical system defining a system optical axis and the multiple sets of mirrors cooperating to point the system optical axis at an angle relative to nadir without moving the platform on which the optical system is supported, comprising:

first and second sets of multiple mirrors configured to receive incident electromagnetic radiation propagating from a target to be imaged, the mirrors in the first and second sets steering the electromagnetic radiation such that it propagates along multiple optical paths for incidence on a detector; and a positioning system operatively associated with the first and second sets of mirrors to move them in a coordinated manner to maintain a common effective focal length of radiation propagating along the multiple optical paths in response to a change in the angle between the system optical axis relative to nadir and thereby provide a coherent radiation pattern at the detector.

2. The optical system of claim 1, in which the first and second sets of mirrors are arranged along peripheries of respective first and second ring structures.

3. The optical system of claim 1, in which the detector comprises a charge-coupled device (CCD).

4. The optical system of claim 3, in which the detector includes multiple detector elements, each viewing a radiation pattern bandpass of predetermined wavelength range.

5. The optical system of claim 1, which the detector is coupled to a data processor operative to characterize a point spread function associated with the coherent radiation pattern and to use the characterized function to produce a final set of image data.

* * * * *